July 21, 1953     V. C. WILSON     2,646,565
CATHODE-RAY TUBE SWEEP CIRCUIT
Filed Sept. 18, 1945

INVENTOR
VOLNEY C. WILSON

BY
*Ralph C. Chappell*

ATTORNEY

Patented July 21, 1953

2,646,565

UNITED STATES PATENT OFFICE 2,646,565

CATHODE-RAY TUBE SWEEP CIRCUIT

Volney C. Wilson, Santa Fe, N. Mex., assignor, by mesne assignments, to the United States of America as represented by the Secretary of the Navy Application September 18, 1945, Serial No. 617,138

11 Claims. (Cl. 343—115)

This invention relates to radio echo detection apparatus, and especially to cathode ray tube indicators which may be used therewith.

In the art of radio echo detection, electromagnetic radiation, usually at high frequency having waves measured in centimeters, is directed in a relatively narrow beam out into space and this beam is caused to scan a given field. Upon striking an object in space this radiation is reflected back to the source and may be received there. The velocity of such radiation is the same as that of light and is approximately 186,000 miles per second. If, then, the time required for the electromagnetic wave to leave the transmitter, travel to the object in space, and be reflected back again to the transmitter be measured, this time interval will give an accurate indication of the distance between the object and the transmitter. If, at the same time, the direction of the beam when the signal is reflected back is noted, this provides an indication of the direction of the object from the transmitter.

Such a system has been used with a directional antenna, mounted to rotate about a vertical axis, so that the beam of radiation projected from the antenna system may be made to scan an angle of 360° around the axis. The vertical angle of the directional antenna in such a system is adjusted as desired and then not changed when the system is operating, so that the field is scanned in one coordinate.

With such a system, a cathode ray tube has been used for the indication, the reflected signal causing a spot of light to appear on the face of the tube. The angle of a radial line through this spot with respect to some reference radial line then may be made to represent the angular direction of the object with respect to a predetermined reference line perpendicular to the rotating axis of the antenna system. The distance of the spot of light from the center of the tube can be made proportional to the range or distance between the object and the transmitter. The deflection of the electron beam in such an indicating tube has in the past been controlled by a magnetic yoke surrounding the neck of the tube and rotated in synchronism with the rotation of the antenna system.

It is an object of this invention to provide a means for producing a radial sweep of the electron beam of a cathode ray tube which may be made to rotate about the center of the tube at any desired angular velocity.

It is another object of this invention to provide a means for producing a repeated radial sweep of the electron beam of a cathode ray tube which may be made to rotate about the center of the tube screen at any desired angular velocity and with means for accurately centering the beam on the tube screen between successive radial sweeps.

It is another object of this invention to provide a means for producing a repeated radial sweep of the electron beam of a cathode ray tube which may be rotated about the center of the tube screen and is readily capable of being synchronized with a remotely displaced moving element.

Other objects and features of the present invention will become apparent upon a careful consideration of the following detailed description of the invention. It is to be understood, however, that the teachings of this invention can be extended beyond the application to radio echo apparatus and is therefore not to be restricted except insofar as is dictated by the appended claims.

Figure 1:
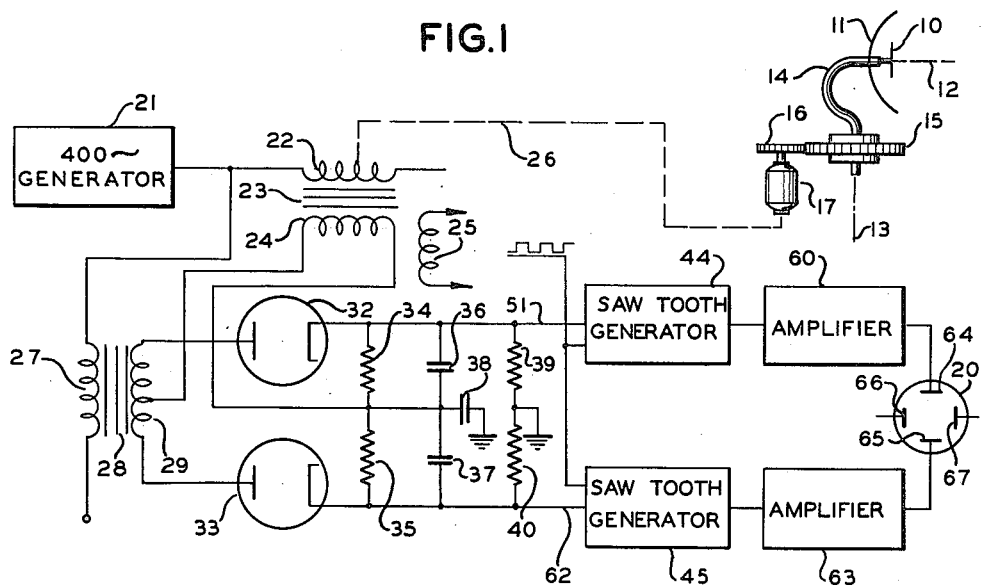
Fig. 1 is a schematic diagram of the invention partly in block form.

Referring now more particularly to Fig. 1 of the drawings, a radiator 10 for electromagnetic waves, as, for instance, a dipole, is shown mounted in a suitable reflector 11, such as a paraboloid, in such a position as to direct a beam 12 of electromagnetic radiation having an axis indicated by the dot and dash line. The radiator 10 and reflector 11 are mounted to rotate about an axis 13 which may be substantially vertical. For this purpose a coaxial line 14 which delivers energy to the radiator 10 is shown curved, so as to be aligned with the axis 13 at a suitable rotating joint 15 through which it passes, for permitting rotation of the radiator 10 and reflector 11 without disturbing the connection. The reflector 11 is shown supported upon the coaxial line 14, although, of course, any means of supporting the reflector to permit rotation about the axis may be used. The rotation of the radiator 10 and reflector 11, which constitute the antenna system, may be accomplished by means of meshing gears 15 and 16, the former being secured to the coaxial line 14 and the latter to the shaft of a driving motor 17.

Any other means of mounting the radiator and reflector so as to cause the beam 12 to scan substantially a 360° angle about the axis 13 may be used, as well as any other type of directional antenna system, it being understood that the arrangement shown in Fig. 1 is merely illustrative and not intended to limit the invention to any particular form or apparatus.

The radiator 10 is connected to a transmitter and receiver not shown. The receiver is associated with a cathode ray tube 20, in a manner not shown, for varying the intensity of the electron beam of the cathode ray tube 20, all as more particularly shown in the copending application of James F. Koehler, entitled "Radio Echo Detection System," Serial Number 594,044, filed May 16, 1945, now U. S. Patent No. 2,605,461 of July 29, 1952.

The principal feature of the present invention as described from the invention claimed in the aforesaid application, resides in the circuit for deflecting the electron beam of the cathode ray tube 20. According to the invention a generator 21 is provided for providing low frequency power, as for example, 400 cycles per second. This power is passed through a rotor 22 of a two phase rotary transformer 23. The rotary transformer 23 consists of a primary winding which is the rotor 22, adapted to be rotated about an axis substantially perpendicular to the axis of the winding. The rotor 22 is also substantially symmetrical about the axis of rotation. Two secondary windings 24 and 25 are arranged with their axes at right angles to each other in a plane substantially perpendicular to the axis of rotation. The rotor 22 is arranged in any desired manner to be rotated by the mechanism which controls the scanning of the antenna 10. For the purposes of illustration, this rotational connection has been indicated by the dotted line 26 connecting the rotor 22 and the motor 17. It will be understood that this may be a direct mechanical connection or a connection through synchronous motors, to cause the rotor 22 to follow the movement of the antenna 10, as the latter scans about the vertical axis 13.

The power from the generator 21 in addition to being fed to the rotor 22 is also fed to the primary 27 of a fixed transformer 28, the secondary 29 of which has its ends connected to the plates of two diode rectifier tubes 32 and 33. The cathodes of these tubes are connected together to two substantially equal resistances 34 and 35, the latter being connected to the cathode of the tube 33 and the former being connected to the cathode of the tube 32. These resistances are shunted respectively by capacitors 36 and 37. The juncture of the resistances 34 and 35 is connected through a capacitor 38 to ground.

A pair of diode tubes and an associated fixed transformer such as described above for the secondary 24 are provided for the secondary 25. The secondary 24 is connected between the middle point of the secondary 29 and the juncture of the resistances 34 and 35. With this arrangement the current induced in the secondary 24 and the rotary transformer 23 flows in different directions through two halves of the secondary 29 of the transformer 28, during the half cycles when it is permitted to flow by the action of the rectifier tubes 32 and 33. This current in the secondary 29 will be in phase with the current induced in one half of that secondary by the primary 27, and 180° out of phase with the current similarly induced in the second half of that secondary.

During the half cycle when these two currents are in phase and flowing through the tube 32, a difference in potential will appear across the resistance 34, which will make the cathode of the tube 32 positive with respect to the other end of the resistance 34. At this time, the current from the secondary 24 will also flow through the tube 33 resulting in a difference in potential across the resistance 35, which makes the cathode of the tube 33 more positive than the other end of the resistance 35. Since only the current from the secondary 24 is flowing through the tube 33, the potential of the cathode during this half cycle will not rise to as high a value as the potential of the cathode of the tube 32 which is carrying both currents. During the next half cycle, no current will flow through the tube 32, while current from the secondary 29 will flow through the tube 33. The potentials across the resistances 34 and 35 will charge the filter condensers 36 and 37 with the result that the potentials on the cathodes of the tubes 32 and 33 will follow the envelope of the successive half cycles.

When the potential of the cathode of the tube 32 is higher than the potential of the cathode of the tube 33, current will flow through the circuit including the resistances 39 and 40, and since these resistances are grounded at their point of juncture, the cathode of the tube 32 will be positive with respect to ground, and the cathode of the tube 33 will be negative with respect to the ground, and the magnitude of these potentials will be the same if the resistances 39 and 40 are equal in value. As the rotor 22 of the rotary transformer 23 rotates, the potential of the cathode of the tube 32 will rise, reaching a maximum when the rotor 22 and the secondary 24 are parallel, and will then fall to zero when the rotor 22 and the secondary 24 reach a point at right angles to each other. Continued rotation of the rotor 22 will cause a current in the secondary 24 to be 180° out of phase with that previously produced. Hence the sum of the currents from the secondary 29 and the secondary 24 will flow through the tube 33 during alternate half cycles, while the tube 32 will pass first the current in the secondary 29 and then that from the secondary 24. The resulting effect of the voltages produced across the resistances 34 and 35 will then be to make the cathode of the tube 33 more positive than that of the tube 32, which potentials are maintained by the action of the filter condensers 36 and 37. This produces a current through the circuit of the resistances 40 and 39 operating to make the cathode of the tube 33 positive with respect to ground while that of the tube 32 becomes negative with respect to ground. The potentials of these two cathodes will then rise in this sense until the parallel position of the rotor 22 and the secondary 24 is reached and then will fall again to zero as the rotor 22 continues to rotate.

Thus the cathode of one of the tubes 32 and 33 will have a positive potential and the cathode of the other a negative potential depending on the position of the rotor 22 in the rotary transformer 23, while the 400 cycle voltage will be filtered out. As the position of the rotor changes, these potentials will rise and fall sinusoidally, the magnitude being dependent upon the position of the rotor 22. Hence these direct current potentials may be applied to separate sawtooth generators 44 and 45 which generate the variable deflection voltages for the cathode ray tube 20.

Figure 2:
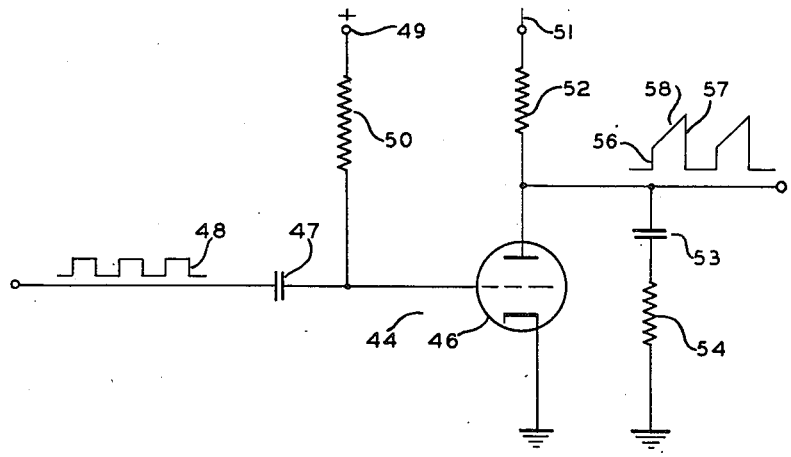
Fig. 2 is a schematic diagram of the saw-tooth wave generator shown in block in Fig. 2.

In Fig. 2 is illustrated saw-tooth generator 44 which is the same as the saw-tooth generator 45 and which is merely exemplary of one saw-tooth voltage generator that may be used. It will be understood that any saw-tooth generator suitable for producing deflection voltages for the cathode ray tube 20 in the conventional manner may be used. The saw-tooth generator 44 comprises a tube 46 which is shown in Fig. 2 as a simple triode. The grid of the tube 46 has applied thereto, through a coupling capacitor 47, as a square wave 48 which may be generated in any suitable and well known manner. The tube 46 is normally conducting by virtue of a positive potential applied to the grid from a source indicated at 49, through a resistor 50. The cathode of the tube 46 is connected directly to ground while the plate is given a potential from the output of the circuit of Fig. 1 through the conductor 51 and a load resistance 52. A capacitor 53 is also connected to the plate of the tube 46 and the other side of this capacitor is connected through a resistance 54 to ground. The heater circuit for the cathode in the associating circuit has been omitted for clearness.

In the operation of the saw-tooth generator 44, the tube 46 is normally conducting and its plate is very nearly at ground potential because of the low resistance of the tube. When the potential of the grid is driven negatively by the leading edge of the square negative pulse of the square wave 48, the plate will rise suddenly in potential because of the voltage dividing action of the resistances 54 and 52 and the steep front 56 of the saw-tooth wave 57 will be formed. Thereafter the capacitor 53 starts to charge and the plate voltage rises to form a slope 58 of the saw-tooth, whereupon the end or trailing edge of the negative square pulse of the square wave 48 swings the potential of the grid positive again and the tube starts to conduct thereby discharging the capacitor 53 through the tube and bringing the plate voltage down again to very nearly ground potential. The saw-tooth wave thus produced between the plate and the tube 46 and ground is delivered to a power amplifier 60. The amplitude of the sweep produced by the saw-tooth generator 44 is directly proportional to the potential applied by the conductor 51 from the output of the discriminator circuit of Fig. 1 and follows a sine wave configuration.

It will be understood that the conductor 62 from the output of the discriminator circuit of Fig. 1 controls the amplitude of the saw-tooth wave produced by the saw-tooth generator 45 and that output from the saw-tooth generator 45 is amplified by the amplifier 63.

Two amplifiers 60 and 63 may take any desired form but it is of particular advantage to use the amplifier shown in Fig. 6 of the copending application of James F. Koehler, Serial Number 594,044, filed May 16, 1945, for Radio Echo Detection System. The particular desirability of the foregoing amplifier resides in the fact that it provides a reference potential for initiating the radio sweep of the electron beam of the cathode ray tube 20 from a fixed point.

The saw-tooth output from the complete circuit of Fig. 1 is employed to energize the vertical deflection plates 64 and 65 of the cathode ray tube 20. The horizontal deflection plates 66 and 67 of the cathode ray tube 20 are energized from a circuit identical to that disclosed in Fig. 1 driven by the secondary 25 of the rotary transformer 23 and another stationary transformer not shown corresponding to stationary transformer 28.

It will be understood from the description of the invention that I have provided means to control the deflection of the electron beam of a cathode ray tube so as to cause the electron beam to sweep from a predetermined point on the face of the tube toward the circumference thereof every time a pulse of high frequency oscillation is radiated from the antenna, and I have also provided means to cause that sweep to rotate about the predetermined point on the face of the tube in synchronism with the rotating antenna. While the invention has been described with reference to electrostatic deflection producing means for the cathode ray tube electron beam, it will be understood that the electromagnetic deflecting means may be used equally well.

Having thus described my invention what I desire to secure by Letters Patent and claim is:

1. In a system for producing a substantially straightline sweep of the electron beam in a cathode ray tube and for causing said sweep to rotate about a predetermined point on the face of said tube, first and second saw-tooth wave form generators, means for producing first and second sinusoidally varying voltages which are 180° out of phase, means for applying said first and second voltages to said first and second saw-tooth wave form generators, respectively, means for applying synchronizing pulses to said saw-tooth wave form generators to determine the recurrence rate of the outputs thereof, and means for applying said outputs to said cathode ray tube.

2. In a system for producing a substantially straightline sweep of the electron beam in a cathode ray tube and for causing said sweep to rotate about a predetermined point on the face of said tube, a pair of saw-tooth wave form generators having anodes and control grids and means for applying synchronizing pulses to said control grids to determine the recurrence rate of said saw-tooth wave forms, means for sinusoidally varying the anode potentials of said saw-tooth generators, said last-mentioned means including an alternating current generator, a rotary transformer, and a push-pull discriminator circuit, the output of said generator being coupled to said rotary transformer and to said push-pull circuit, said push-pull circuit providing a pair of sinusoidally varying potentials 180° out of phase as the rotor of said rotary transformer is rotated, and means for applying said sawtooth wave forms to said cathode ray tube.

3. In a system for producing a substantially straightline sweep of the electron beam in a cathode ray tube and for causing said sweep to rotate about a predetermined point on the face of said tube in synchronism with a rotating antenna, an alternating current generator, a rotary transformer having a rotor coil and at least one stator coil, said rotor coil being energized by said generator and rotated by said antenna, a push-pull discriminator circuit coupled to said stator coil and to said generator, a saw-tooth wave form generator having at least an anode and a control grid, means for applying synchronizing pulses to said control grid to determine the recurrence rate of said saw-tooth wave forms, said anode being energized by the output of said discriminator circuit, and means for applying the output of said saw-tooth generator to said cathode ray tube.

4. In a system for producing a substantially straightline sweep of the electron beam in a cathode ray tube and for causing said sweep to rotate about a predetermined point on the face of said tube in synchronism with a rotating antenna, an alternating current generator, a rotary transformer having a rotor coil and at least one stator coil, said rotor coil being mechanically connected to said antenna and rotatable therewith and energized by said generator, a second transformer having a primary coil energized by said generator and a secondary coil having a tap connected to one of said stator coils, a push-pull discriminator circuit including two diodes, the first diode having its anode connected to one end of said secondary coil, the second diode having its anode connected to the other end of said secondary coil, the output of said discriminator circuit being a pair of voltages sinusoidally varying in amplitude in response to the rotation of said antenna, means for producing square wave voltages, and a pair of saw-tooth wave form generators each having at least an anode and a control grid, said control grids being energized by said square wave voltages and said anodes being coupled to the output of said discriminator circuit, and means for applying the output of said saw-tooth wave generators to said cathode ray tube.

5. A circuit for producing a series of sinusoidally modulated saw-tooth waves comprising, means for generating a sinusoidal voltage of constant amplitude, means for generating a sinusoidal voltage of varying amplitude, an adding and detecting circuit, means for simultaneously applying said sinusoidal voltage of constant amplitude and said sinusoidal voltage of varying amplitude to said adding and detecting circuit to obtain a direct voltage varying in amplitude in accordance with said sinusoidal voltage of varying amplitude, a saw-tooth signal generator having anode and grid circuits, and means for applying said direct voltage to said anode to provide output signals in the form of sinusoidally modulated saw-tooth waves.

6. Apparatus in accordance with claim 5 including means for applying synchronizing pulses to said grid circuit for determining the recurrence rate of said output signals from said saw-tooth generator.

7. A system for producing a substantially straightline sweep of the electron beam in a cathode ray tube comprising, means for generating a sinusoidal voltage of constant amplitude, means for amplitude modulating a portion of said sinusoidal voltage, means for mixing the modulated and unmodulated portions of said sinusoidal voltage, a pair of push-pull connected detectors coupled to said mixing means, the unmodulated portion of said sinusoidal voltage being applied out of phase to said detectors, the modulated portion of said sinusoidal voltage being applied in phase to said detectors, a pair of saw-tooth voltage generators having anode and grid circuits, the outputs of said pair of detectors being applied as anode potentials to respective ones of said pair of saw-tooth voltage generators, means for applying synchronizing pulses to said grids of said saw-tooth voltage generators for determining the recurrence rate of the outputs thereof, and means for applying the outputs of said saw-tooth voltage generators to said cathode ray tube, displacement of said electron beam being determined by instantaneous voltage of said outputs of said saw-tooth generators.

8. Apparatus in accordance with claim 7 wherein said means for amplitude modulating said portion of said sinusoidal voltage comprises a rotary transformer having rotor and stator coils, said rotor coil being rotatable relative to said stator coils and energized from said generator of sinusoidal voltage of constant amplitude, said electron beam thereby being rotatable in synchronism with said rotor coil.

9. A system for producing a substantially straightline sweep of the electron beam in a cathode ray tube and for causing said sweep to rotate about a predetermined point on the face of said cathode ray tube in synchronism with a rotatable antenna comprising, a generator of sinusoidal voltage, a rotary transformer having a rotor coil and first and second stator coils, said stator coils being disposed in perpendicular axial relationship to each other and having their axes in a plane perpendicular to the axis of rotation of said rotor coil, a first phasing circuit including a fixed transformer having a primary coil and a tapped secondary coil, means for energizing said rotor coil and said primary coil from said generator, said rotor coil being rotatably coupled to said antenna, means connecting one of said stator coils to the tap of said secondary coil, a pair of rectifier tubes having their anodes connected to the ends of said secondary coil, said rectifier tubes having balanced output circuits, a pair of saw-tooth generators connected to derive their respective anode potentials from said balanced output circuits, means for applying synchronizing pulses to said saw-tooth generators to determine the recurrence rate of output saw-tooth signals therefrom, means for applying the outputs of said saw-tooth generators to first opposed deflecting plates of said cathode ray tube, a second phasing circuit similar to said first phasing circuit and similarly energized from said generator of sinusoidal voltage and from said second stator coil, the output of said second phasing circuit being applied to second opposed deflecting plates of said cathode ray tube whereby said electron beam is formed into a sweep line which is caused to rotate in synchronism with said rotatable antenna.

10. In an indicating system employing polar scanning of a cathode ray tube the combination of, means for generating a sinusoidal voltage of constant amplitude, a variably coupled two-phase transformer having a primary winding adapted to be rotated in synchronism with an antenna and a pair of stationary secondary windings in quadrature phase relationship, means for supplying said primary winding with said sinusoidal voltage whereby sinusoidal voltages of varying amplitude are produced at the individual secondary windings, the respective amplitudes of said last-mentioned voltages depending upon the instantaneous position of the antenna with respect to a predetermined reference line means for deriving direct voltages varying in amplitude in accordance with said sinusoidal voltage of varying amplitude, saw-tooth generating means having anode and control grid circuits, means for applying said direct voltages to said anode circuits to provide output signals in the form of sinusoidally modulated, quadrature phased saw-tooth waves and means for applying said output signals to the deflecting elements of a cathode ray tube whereby its electron beam is formed into a sweep line which rotates in synchronism with said antenna.

11. In an indicating system employing polar scanning of a cathode ray tube the combination of, a source of constant amplitude sinusoidal voltage, a variably coupled two-phase transformer having a primary adapted to be rotated in synchronism with a directional antenna and a pair of stationary secondary windings in quadrature phase relationship, means for energizing said primary with said sinusoidal voltage whereby quadrature phased sinusoidal voltages of varying amplitudes are produced at the secondary windings, the amplitude values of said last-mentioned voltages depending upon the instantaneous position of said directional antenna with respect to a preselected reference line, adding and detecting circuits, means for simultaneously applying said constant amplitude sinusoidal voltage and said quadrature phased sinusoidal voltage signals of varying amplitude to said adding and detecting circuits to obtain quadrature phased direct voltage signals varying in amplitude in accordance with said sinusoidal voltage of varying amplitude, saw-tooth generating means having anode and control grid circuits, means for applying said direct voltage signals to said anode circuits to provide output signals in the form of quadrature phased sinusoidally modulated saw-tooth waves and means for applying said output signals to the deflecting elements of a cathode ray tube whereby its electron beam is formed into a sweep line which rotates in synchronism with said antenna.

VOLNEY C. WILSON.

References Cited in the file of this patent

UNITED STATES PATENTS

| Number | Name | Date |
|---|---|---|
| 2,295,412 | Little | Sept. 8, 1942 |
| 2,313,966 | Poch | Mar. 16, 1943 |
| 2,400,791 | Tolson et al. | May 21, 1946 |
| 2,403,967 | Busignies | July 16, 1946 |
| 2,412,291 | Schade | Dec. 10, 1946 |
| 2,421,312 | Bobb | May 27, 1947 |
| 2,421,747 | Engelhardt | June 10, 1947 |
| 2,437,275 | Skene et al. | Mar. 9, 1948 |
| 2,444,330 | Branson | June 29, 1948 |
| 2,466,712 | Kenyon | Apr. 12, 1949 |
| 2,471,516 | Bryant | May 31, 1949 |